US012577507B2

(12) United States Patent
Creutz et al.

(10) Patent No.: US 12,577,507 B2
(45) Date of Patent: Mar. 17, 2026

(54) FUNCTIONAL SUBSTANCE RELEASING AGENT

(71) Applicant: Dow Silicones Corporation, Midland, MI (US)

(72) Inventors: Serge Creutz, Liege (BE); Rahma Benbakoura, Quaregnon (BE); Sebastien Grofils, Spy (BE)

(73) Assignee: Dow Silicones Corporation, Midland, MI (US)

( * ) Notice: Subject to any disclaimer, the term of this patent is extended or adjusted under 35 U.S.C. 154(b) by 297 days.

(21) Appl. No.: 18/251,026

(22) PCT Filed: Dec. 2, 2021

(86) PCT No.: PCT/US2021/061508

§ 371 (c)(1),
(2) Date: Apr. 28, 2023

(87) PCT Pub. No.: WO2022/125359

PCT Pub. Date: Jun. 16, 2022

(65) Prior Publication Data

US 2023/0407211 A1 Dec. 21, 2023

Related U.S. Application Data

(60) Provisional application No. 63/124,235, filed on Dec. 11, 2020.

(51) Int. Cl.

| | |
|---|---|
| ***C07F 7/04*** | (2006.01) |
| ***C11D 3/16*** | (2006.01) |
| ***C11D 3/37*** | (2006.01) |
| ***C11D 3/50*** | (2006.01) |

(52) U.S. Cl.

CPC .............. *C11D 3/507* (2013.01); *C11D 3/162* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 7,098,178 | B2 | 8/2006 | Gerke et al. |
| 8,420,845 | B2 | 4/2013 | Abe et al. |
| 8,481,776 | B2 | 7/2013 | Abe et al. |
| 8,603,962 | B2 | 12/2013 | Bastigkeit et al. |
| 9,321,986 | B2 | 4/2016 | Bauer et al. |
| 9,587,206 | B2 | 3/2017 | Bauer et al. |
| 10,099,194 | B2 | 10/2018 | Lei et al. |
| 2006/0160711 | A1 | 7/2006 | Frank et al. |
| 2006/0165740 | A1 | 7/2006 | Frank et al. |
| 2009/0099382 | A1 | 4/2009 | Gerke et al. |
| 2009/0312231 | A1* | 12/2009 | Huchel ..................... C07F 7/04 512/10 |
| 2014/0323375 | A1* | 10/2014 | Bauer .................... C11D 3/507 512/2 |
| 2014/0329732 | A1* | 11/2014 | Bauer ...................... A61K 8/49 512/2 |
| 2016/0137674 | A1 | 5/2016 | Panandiker et al. |
| 2019/0010427 | A1 | 1/2019 | Frankenbach et al. |
| 2020/0131450 | A1 | 4/2020 | Denutte et al. |

FOREIGN PATENT DOCUMENTS

| | | |
|---|---|---|
| EP | 1116788 | 7/2001 |
| EP | 1024785 | 1/2003 |
| WO | 2007128326 | 11/2007 |

OTHER PUBLICATIONS

"Reactive & Non-Reactive Modified Silicone Fluid Reactive Silicone Fluids 2-6 Non-Reactive Silicone Fluids 7-9 Storage & Handling Precautions 9", ShinEtsu, 2006, pp. 1-2.

* cited by examiner

*Primary Examiner* — Lorna M Douyon
(74) *Attorney, Agent, or Firm* — Thomas S. Deibert

(57) ABSTRACT

A functional substance releasing agent is provided, comprising: a silicic acid ester of formula (I)

(I)

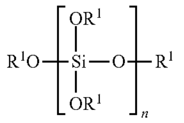

wherein n is 2 to 50; wherein each $R^1$ is independently selected from the group consisting of H, $C_{1-22}$ alkyl groups, a $—CNH_2$ group, a $—R^2CNH_2$ group, a $—CNHR_3$ group, a $—CNHR_3$ group and a $—R^2CNR_3$ group; wherein each $R^2$ is independently a divalent group having 1 to 22 carbon atoms per molecule; and wherein each $R^3$ is independently selected from a residual group from a functional molecule; wherein the functional molecule is selected from the group consisting of an aldehyde, a ketone and mixtures thereof.

9 Claims, No Drawings

FUNCTIONAL SUBSTANCE RELEASING AGENT

The present invention relates to a functional substance releasing agent. In particular, the present invention relates to a functional substance releasing agent, comprising a silicic acid ester of formula (I)

(I)

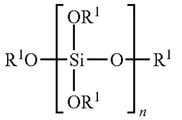

wherein n is 2 to 50; wherein each $R^1$ is independently selected from the group consisting of H, $C_{1-22}$ alkyl groups, a $—CNH_2$ group, a $—R^2CNH_2$ group, a $—CNHR^3$ group, a $—R^2CNHR^3$ group, a $—CNR^3$ group and a $—R^2CNR^3$ group; wherein each $R^2$ is independently a divalent group having 1 to 22 carbon atoms per molecule; and wherein each $R^3$ is independently selected from a residual group from a functional molecule; wherein the functional molecule is selected from the group consisting of an aldehyde, a ketone and mixtures thereof.

Functional substances (e.g., fragrances) are used in various products to enhance the consumer experience and enjoyment of a product. For example, fragrances are added to many consumer products including home care products, such as, fabric/laundry treatment formulations (e.g., laundry detergents, fabric softeners, fabric/laundry refreshers) and personal care products, such as, shampoos, conditioners, body washes, hand soaps, deodorants.

Given the volatility of many functional substances, such as, fragrances, they evaporate and their benefit fades quickly over time after use by the consumer. Hence, it is desirable to have formats that facilitate the delivery of such functional substances over a prolonged period post use/application by the consumer.

One mechanism for providing release of a functional substance over time has been disclosed by Abe et al. in U.S. Pat. No. 8,420,845. Specifically, Abe et al. disclose a functional substance releasing agent, comprising a silicate ester compound represented by the following formula (1) in an amount of 35 to 95% by mass and a silicate ester compound represented by the following formula (2) in an amount of 0.5 to 35% by mass:

(1)

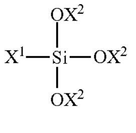

(2)

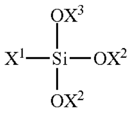

wherein $X^1$ represents an aliphatic hydrocarbon group having 10 to 18 carbon atoms in total that are optionally substituted with phenyl, hydroxy or an alkoxy group; $X^2$ represents a residual group excluding a hydroxy group from a functional alcohol, and a plurality of $X^2$s may be the same as or different from one another; and $X^3$ represents a hydrogen atom or an alkyl group having 1 to 6 carbon atoms.

Notwithstanding, there remains a continuing need for functional substance releasing agents that provide for the controlled, extended release of function substances over time.

The present invention provides a functional substance releasing agent, comprising a silicic acid ester of formula (I)

(I)

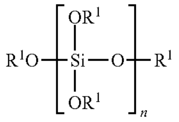

wherein n is 2 to 50; wherein each $R^1$ is independently selected from the group consisting of H, $C_{1-22}$ alkyl groups, a $—CNH_2$ group, a $—R^2CNH_2$ group, a $—CNHR^3$ group, a $—R^2CNHR^3$ group, a $—CNR^3$ group and a $—R^2CNR^3$ group; wherein each $R^2$ is independently a divalent group having 1 to 22 carbon atoms per molecule; and wherein each $R^3$ is independently selected from a residual group from a functional molecule; wherein the functional molecule is selected from the group consisting of an aldehyde, a ketone and mixtures thereof.

The present invention provides a laundry treatment formulation comprising the functional substance releasing agent of the present invention.

The present invention provides a method of treating laundry comprising: providing an article of laundry; providing a laundry treatment formulation according to the present invention; and applying the laundry treatment formulation to the article of laundry to provide a treated article of laundry.

DETAILED DESCRIPTION

It has been surprisingly found that the functional substance releasing agent of the present invention provides the deposition and release of functional substances over time in various consumer applications including fabric care compositions.

Unless otherwise indicated, ratios, percentages, parts, and the like are by weight.

Weight percentages (or wt %) in the composition are percentages of dry weight, i.e., excluding any water that may be present in the composition.

Preferably, the functional substance releasing agent of the present invention, comprises a silicic acid ester of formula (I)

(I)

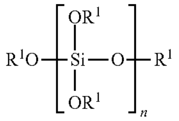

wherein n is 2 to 50 (preferably, wherein n is 2 to 20; more preferably, wherein n is 3 to 10; most preferably, wherein n is 4 to 8); wherein each $R^1$ is independently selected from the group consisting of H, a $C_{1-22}$ alkyl group, a $—CNH_2$ group, a $—R^2CNH_2$ group, a $—CNHR^3$ group, a $—R^2CNHR^3$ group, a $—CNR^3$ group and a $—R^2CNR^3$ group (preferably, wherein each $R^1$ is independently selected from the group consisting of a $C_{1-22}$ alkyl group, a $—R^2CNH_2$ group, a $—R^2CNHR^3$ group, a $—CNR^3$ group and a $—R^2CNR^3$ group); wherein each $R^2$ is independently a divalent group having 1 to 22 (preferably, 2 to 11; more preferably, 3 to 7; still more preferably, 3 to 6; most preferably, 3 to 5) carbon atoms per molecule (preferably, each $R^2$ is a divalent hydrocarbyl group having 1 to 22 (preferably, 2 to 11; more preferably, 3 to 7; still more preferably, 3 to 6; most preferably, 3 to 5) carbon atoms per molecule); and wherein each $R^3$ is independently selected from a residual group from a functional molecule; wherein the functional molecule is selected from the group consisting of an aldehyde, a ketone and mixtures thereof.

Preferably, 0.1 to 90 mol % of the $R^1$ groups in the functional substance releasing agent of formula (I) include an $R^3$. More preferably, 25 to 85 mol % of the $R^1$ groups in the functional substance releasing agent of formula (I) include an $R^3$. Still more preferably, 40 to 80 mol % of the $R^1$ groups in the functional substance releasing agent of formula (I) include an $R^3$. Most preferably, 50 to 75 mol % of the $R^1$ groups in the functional substance releasing agent of formula (I) include an $R^3$.

Preferably, each $R^3$ group in the functional substance releasing agent of formula (I) is independently selected from the group consisting of (a) a residual group excluding an oxygen from a carbonyl group of the functional molecule and (b) a residual group incorporated via 1,4 addition at a vinyl group of the functional molecule.

Preferably, the functional molecule is selected from the group consisting of fragrance functional molecules; antibactertical functional molecules having antibacterial, antimicrobial and/or antifungal properties (e.g., formaldehyde, phthaladehyde and glutaraldehyde) and physiologically active functional molecules. More preferably, the functional molecule is a fragrance functional molecule. Most preferably, the functional molecule is a fragrance functional molecule; wherein the fragrance functional molecule is selected from the group consisting of fragrance aldehydes, fragrance ketones and mixtures thereof.

Preferably, the fragrance aldehydes are selected from the group consisting of hexyl aldehyde; heptyl aldehyde; octyl aldehyde; nonyl aldehyde; 3,5,5-trimethyl hexanal; decyl aldehyde; citral; undecyl aldehyde; dodecyl aldehyde; nonenal; decenal; undecenal; nonadienal; 2,6,10-trimethyl-9-undecenal; 2-methylundecanal; tridecanal; tetradecanal; geranial; neral; citronellal; dihydrocitronellal; 2,4-dimethyl-3-cyclohexene-1-carboxaldehyde; 2-methyl-3-(4-isopropylphenyl)propanal; 2-methyl-3-(4-tert-butylphenyl)propanal; 2-methyl-3-(4-(2-methylpropyl)phenyl)propanal; anisic aldehyde; cetanol; 3-(3-isopropylphenyl)butanal; 2,6-dimethyl-heptenal; 4-methylphenylacetaldehyde; 1-methyl-4-(4-methylpentyl)-3-cyclohexene-carbaldehyde; butyl cinnamic aldehyde; amyl cinnamic aldehyde; hexyl cinnamic aldehyde; 4-methyl-alpha-pentyl cinnamic aldehyde; alpha-2,2,3-tetramethyl-3-cyclopentene-1-butyraldehyde; isohexenyl tetrahydro benzaldehyde; citronellyl oxyacetaldehyde; melafleur; lyral; 2-methyl-3-(para-methoxy phenyl)propanal; cyclemone A; 3-(2-ethylphenyl)-2,2-dimethylpropanal; dimethyl decadienal; alpha-methyl-3,4-(methylenedoxy)hydrocinnamaldehyde; isocyclocitral; methyl cinnamic aldehyde; methyl octyl aldehyde; anisaldehyde; benzaldehyde; cinnamaldehyde; amylcinnamic aldehyde; hexycinnamic aldehyde; heliotropin; 3-methyl-5-phenyl-1-pentanal; 2-methylundecanal; 3-propylbicyclo[2.2.1]hept-5-ene-2-carbaldehyde; 2-methyl-3-phenyl-2-propenal; alpha-methyl-4-(1-methylethyl)benzeneacetaldehyde; 2-methyl-octanal; 3,7-dimethyl-2-methylene-6-octenal; para-tolylacetaldehyde; beta-damascenone (ketone); and mixtures thereof.

Preferably, the fragrance ketones are selected from the group consisting of 4-hydroxy-3-methoxybenzaldehyde; 1,7,7-trimethylbicyclo[2.2.1]heptan-2-one; (R)-carvone; (S)-carvone; 2-heptanone; Z-jasmone; alpha damascone; beta damascone; delta damascone; damascenone; dihydro ionone beta; geranylacetone; benzylacetone; beta ionone; alpha ionone; gamma methylionone; methyl heptenone; 2-(2-(4-methyl-3-cyclohexen-1-yl)propyl)cyclopentanone; 5-cyclohexadecen-1-one; 6,7-dihydro-1,1,2,3,3-pentamethyl-4(5H)-indanone; heptyl cyclopentanone; hexyl cyclopentanone; 7-acetyl-1,2,3,4,5,6,7,8-octahydro-1,1,6,7-tetramethyl naphthalene; isocyclemone E; methyl cedryl ketone; methyl dihydrojasmonate; koavone; menthone and mixtures thereof.

Preferably, the functional substance releasing agent of the present invention contains <5 wt % (preferably, <1 wt %; more preferably, <0.1 wt %; still more preferably, <0.01 wt %; most preferably, less than the detectable limit), based on weight of the functional substance releasing agent, of a compound of formula (II)

(II)

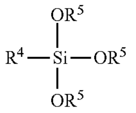

wherein $R^4$ is an aliphatic hydrocarbon group having 10 to 18 carbon atoms in total that are optionally substituted with phenyl, hydroxy or an alkoxy group; wherein $R^5$ is a residual group excluding the hydroxy group from a functional alcohol.

Preferably, the functional substance releasing agent of the present invention contains less than the detectable limit of a compound of formula (III)

(III)

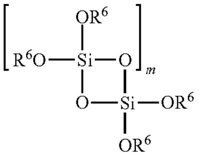

wherein m is 1 to 20; and each $R^6$ is independently selected from the group consisting of H, linear or branched, saturated or unsaturated, substituted or unsubstituted $C_{1-6}$ hydrocarbon radicals, perfume alcohol radicals, and biocide alcohol radicals.

Preferably, the functional substance releasing agent of the present invention contains less than the detectable limit of alkoxy groups incorporated via a condensation reaction eliminating a —OH functionality from a functional molecule (e.g., a fragrance alcohol or biocide alcohol).

Preferably, the functional substance releasing agent of the present invention contains less than the detectable limit of a polymer with a positively charged functional group. The term polymer as used herein stands for a molecule made up of at least 10 monomer repeat units.

The functional substance releasing agent of the present invention may be incorporated into a variety of formulations including laundry treatment formulations (e.g., laundry detergents, fabric softeners, laundry refreshers); hard surface care formulations; air care formulations and personal care formulations (e.g., soaps, shampoos, bodywashes, conditioners, deodorants).

Preferably, the laundry treatment formulation of the present invention comprises a functional substance releasing agent of the present invention. More preferably, the laundry treatment formulation of the present invention comprises a functional substance releasing agent of the present invention; wherein the laundry treatment formulation is selected from the group consisting of a laundry detergent formulation, a fabric softening formulation and a laundry refreshing formulation.

Preferably, the method of treating laundry of the present invention, comprises: providing an article of laundry; providing a laundry treatment formulation comprising a functional substance releasing agent of the present invention; and applying the laundry treatment formulation to the article of laundry to provide a treated article of laundry.

Preferably, the method of treating laundry of the present invention, comprises: providing an article of laundry; providing a laundry treatment formulation comprising a functional substance releasing agent of the present invention; providing a bath water; and applying the laundry treatment formulation to the article of laundry in the presence of the bath water to provide the treated article of laundry.

Preferably, the method of preparing a functional substance releasing agent of the present invention, comprises (A) reacting an amino alcohol containing 1 to 22 carbon atoms (preferably, 3 to 12 carbon atoms; more preferably, 4 to 8 carbon atoms; still more preferably, 4 to 7 carbon atoms; most preferably, 4 to 5 carbon atoms) per molecule and a $—CNH_2$ moiety with a silicic acid ester of formula (IV)

(IV)

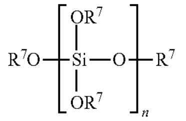

wherein n is 2 to 50 (preferably, 2 to 20; more preferably, 3 to 10; most preferably, 4-8) and wherein each $R^7$ group is independently selected from the group consisting of H, and a $C_{1-22}$ alkyl group (preferably, $C_{1-10}$ alkyl groups; more preferably, $C_{1-5}$ alkyl group; still more preferably, $C_{1-4}$ alkyl group; most preferably, $C_{2-3}$ alkyl group); and (B) reacting the product of (A) with a functional molecule to form the functional substance releasing agent. Preferably, the amino alcohol used in the method of making the functional substance releasing agent of the present invention contains only one —OH moiety per molecule (e.g., 2-((2-aminoethyl) amino)ethan-1-ol; 4-(2-aminoethyl)phenol; (1H-imidazol-5-yl)methanol). More preferably, the amino alcohol used in the method of making the functional substance releasing agent of the present invention contains only one —OH moiety per molecule and only one $—CNH_2$ moiety per molecule. Preferably, the the amino alcohol used in the method of making the functional substance releasing agent of the present invention is a linear amino alcohol.

Some embodiments of the present invention will now be described in detail in the following Examples.

Example S1: Preparation of Functional Substance Releasing Agent

In a two neck flask, fitted with a Dean Stark apparatus and a condenser on top, was charged with Dynasil 40 oligomeric ethyl silicate (23.58 g) and then with 5-amino-1-pentanol (33.30 g). The flask headspace was flushed with nitrogen and the flask contents were then heated to 80° C. (set point temperature) with continual stirring. When the flask contents reached 80° C., a vacuum of 850 mbars was pulled on the flask headspace. Ethanol coming from the transesterification reaction was collected after the condenser to follow the reaction. As the reaction started, vacuum was progressively decreased until 110 mbars and the temperature of the flask contents progressively increased to 105° C. The product polymer was analyzed by proton and by $^{13}C$ NMR to have a 95.6 mol % of aminopentanol charged substituted onto the Dynasil forming an amine substituted silicic acid ester base material.

Example 1: Preparation of Functional Substance Releasing Agent

In a two neck flask, was charged benzaldehyde (6.48 g). The flask was closed up and the vapor space was flushed with nitrogen for a few minutes. While maintaining the flask contents under a nitrogen blanket, an amine substituted silicic acid ester base material (8.72 g) prepared according to Example S1 was added to the flask dropwise with stirring. The exotherm was managed through the addition rate to keep the temperature of the flask contents below 30° C. The product was analyzed by proton and $^{13}C$ NMR to have 95.2 mol % of the benzaldehyde reacted onto the amine substituted silicic acid ester base material through reaction with $—NH_2$ moieties on the silicic acid base material to form a functional substance releasing agent.

Example 2: Preparation of Functional Substance Releasing Agent

In a two neck flask, was charged (E)-1-(2,6,6-trimethyl-1-cyclohexenyl)but-2-en-1-one (beta-Damascone, available from Parchem)(5.87 g). The flask was closed up and the vapor space was flushed with nitrogen for a few minutes. While maintaining the flask contents under a nitrogen blanket, an amine substituted silicic acid ester base material (7.97 g) prepared according to Example S1 was added to the flask dropwise with stirring. The exotherm was managed through the addition rate to keep the temperature of the flask contents below 30° C. The product was analyzed by proton and $^{13}C$ NMR to have 92 mol % of the beta-Damacone reacted onto the amine substituted silicic acid ester base material through reaction with $—NH_2$ moieties on the silicic acid base material to form a functional substance releasing agent.

Performance Testing for Product of Example 1

Benzaldehyde (0.525 g) was directly applied to a first terry towel. An equivalent amount of benzaldehyde was applied to a second terry towel through application of the functional substance releasing agent of Example 1 (2.3 g diluted to 48.4 wt % in isopropanol). Sniff tests were made on both of the treated terry towels. Five panelists were asked which one of the terry towels had the highest odor intensity. Each of the panelists assigned the most intense smelling terry towel a value of 2, the least intense smelling terry towel a value of 1 and in case of a draw both terry towels were assigned a 1. The sniff tests were performed on both towels dry after aging 1 day and 7 days. The towels were first tested dry, then were rewetted slightly with water and tested again. The aggregate results of the sniff tests are provided in TABLE 1.

TABLE 1

| Substance | Dry Score | | Wetted Score | |
|---|---|---|---|---|
| applied | Day 1 | Day 7 | Day 1 | Day 7 |
| Benzaldehyde | 5 | 5 | 5 | 5 |
| Example 1 | 10 | 10 | 10 | 10 |

Performance Testing for Product of Example 2

(E)-1-(2,6,6-trimethyl-1-cyclohexenyl)but-2-en-1-one (beta-Damascone, available from Parchem)(0.525 g) was directly applied to a first terry towel. An equivalent amount of beta-Damascone was applied to a second terry towel through application of the functional substance releasing agent of Example 2 (2.47 g diluted to 50 wt % in isopropanol). Sniff tests were made on both of the treated terry towels. Five panelists were asked which one of the terry towels had the highest odor intensity. Each of the panelists assigned the most intense smelling terry towel a value of 2, the least intense smelling terry towel a value of 1 and in case of a draw both terry towels were assigned a 1. The sniff tests were performed on both towels dry after aging 1 day and 7 days. The towels were first tested dry, then were rewetted slightly with water and tested again. The aggregate results of the sniff tests are provided in TABLE 2.

TABLE 2

| Substance | Dry Score | | Wetted Score |
|---|---|---|---|
| applied | Day 1 | Day 7 | Day 7 |
| beta-Damascone | 8 | 7 | 5 |
| Example 2 | 7 | 8 | 10 |

Washing Machine Test Performance

A fabric softener formulation Kao (12 wt % ester quat) was prepared containing 1 wt % substance added as noted in TABLE 3. A load of 5 pillowcases and 4 small terry towels was used for each test. The washing machine program was set at 40° C., rotation speed of 600 rpm, short cycle (1 h12), 11 L of water with a hardness of 27.5° F. (ratio Ca/Mg 4:1). A WFK detergent powder (35 g) was used in the main wash. The fabric softener formulation was added to the laundry in the last rinse cycle. Sniff tests were made on the treated terry towels for each fabric softener formulation. Six panelists were asked which one of the terry towels had the highest odor intensity. Each of the panelists assigned the most intense smelling terry towel a value of 2, the least intense smelling terry towel a value of 1 and in case of a draw both terry towels were assigned a 1. The sniff tests were performed on both towels dry after aging 1 day and 7 days. The towels were first tested dry, then were rewetted slightly with water and tested again. The aggregate results of the sniff tests are provided in TABLE 3.

TABLE 3

| Substance | Dry Score | | Wetted Score | |
|---|---|---|---|---|
| applied | Day 1 | Day 7 | Day 1 | Day 7 |
| beta-Damascone | 7 | 5 | 6 | 4 |
| Example 2 | 8 | 7 | 12 | 8 |

We claim:

1. A functional substance releasing agent, comprising a silicic acid ester of formula (I)

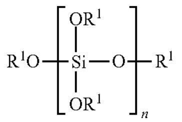

(I)

wherein n is 2 to 50; wherein each $R^1$ is independently selected from the group consisting of H, $C_{1-22}$ alkyl groups, a $—CNH_2$ group, a $—R^2CNH_2$ group, a $—CNHR^3$ group, a $—R^2CNHR^3$ group, a $—CNR^3$ group and a $—R^2CNR^3$ group; wherein 50 to 75 mol % of the $R^1$ groups in the functional substance releasing agent of formula (I) include an $R^3$, wherein each $R^2$ is independently a divalent group having 1 to 22 carbon atoms per molecule; and wherein each $R^3$ is independently selected from a residual group from a functional molecule; wherein the functional molecule is selected from the group consisting of an aldehyde, a ketone and mixtures thereof.

2. The functional substance releasing agent of claim 1, wherein each $R^3$ is independently selected from the group consisting of (a) a residual group excluding an oxygen atom from a carbonyl group of the functional molecule and (b) a residual group incorporated via 1,4 addition at a vinyl group of the functional molecule.

3. The functional substance releasing agent of claim 1, wherein the functional molecule is a fragrance functional molecule selected from the group consisting of a fragrance aldehyde, a fragrance ketone and mixtures thereof.

4. The functional substance releasing agent of claim 1, wherein the functional substance releasing agent contains <5 wt %, based on weight of the functional substance releasing agent, of a compound of formula (II)

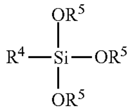

wherein $R^4$ is an aliphatic hydrocarbon group having 10 to 18 carbon atoms in total that are optionally substituted with phenyl, hydroxy or an alkoxy group; wherein $R^5$ is a residual group excluding the hydroxy group from a functional alcohol.

5. The functional substance releasing agent of claim 1, wherein the functional substance releasing agent contains less than the detectable limit of a compound of formula (III)

(III)

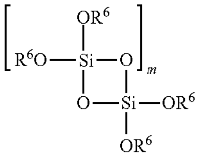

wherein m is 1 to 20; and each $R^6$ is independently selected from the group consisting of H, linear or branched, saturated or unsaturated, substituted or unsubstituted $C_{1-6}$ hydrocarbon radicals, perfume alcohol radicals, and biocide alcohol radicals.

6. A laundry treatment formulation comprising the functional substance releasing agent of claim 1.

7. The laundry treatment formulation of claim 6, wherein the laundry treatment formulation is selected from the group consisting of a laundry detergent formulation, a fabric softening formulation and a laundry refreshing formulation.

8. A method of treating laundry comprising:

providing an article of laundry;

providing a laundry treatment formulation according to claim 6; and applying the laundry treatment formulation to the article of laundry to provide a treated article of laundry.

9. The method of claim 8, further comprising:

providing a bath water;

wherein the laundry treatment formulation is applied to the article of laundry in the presence of the bath water to provide the treated article of laundry.

* * * * *